(12) United States Patent
Adams

(10) Patent No.: US 10,022,642 B1
(45) Date of Patent: Jul. 17, 2018

(54) HAND SEWN TOY KIT

(71) Applicant: Jamie Adams, Portland, OR (US)

(72) Inventor: Jamie Adams, Portland, OR (US)

( * ) Notice: Subject to any disclaimer, the term of this patent is extended or adjusted under 35 U.S.C. 154(b) by 0 days.

(21) Appl. No.: 15/596,885

(22) Filed: May 16, 2017

(51) Int. Cl.
- *A63H 33/04* (2006.01)
- *A63H 33/00* (2006.01)
- *G09B 19/20* (2006.01)
- *D05B 91/14* (2006.01)

(52) U.S. Cl.
CPC ............ *A63H 33/00* (2013.01); *D05B 91/14* (2013.01); *G09B 19/20* (2013.01)

(58) Field of Classification Search
USPC ...................................... 446/86, 98
See application file for complete search history.

(56) References Cited

U.S. PATENT DOCUMENTS

| | | | | |
|---|---|---|---|---|
| 526,319 A * | 9/1894 | Homes | ...................... | A63H 3/02 446/369 |
| 2,585,946 A * | 2/1952 | Liberman | ................ | D05B 1/02 112/400 |
| 3,041,778 A * | 7/1962 | Seron | ........................ | A63H 3/14 156/63 |
| 3,136,412 A * | 6/1964 | Karosen | .................... | A41H 3/08 206/457 |
| 3,316,669 A * | 5/1967 | Nachbar | ................ | A63H 33/38 273/DIG. 30 |
| 3,800,436 A * | 4/1974 | Matzek | .................. | G09B 19/20 434/95 |
| 4,032,012 A * | 6/1977 | Bishop | .................... | A41H 31/00 2/171 |
| 4,579,537 A | 4/1986 | Leahy | | |
| 4,777,681 A * | 10/1988 | Luck | ..................... | A47C 27/144 5/502 |
| 4,925,423 A * | 5/1990 | Miller | ....................... | A63H 3/52 446/370 |
| 4,979,924 A | 12/1990 | Manger | | |
| 5,046,986 A | 9/1991 | Wood et al. | | |
| D323,921 S * | 2/1992 | Kawchak | ........................ | D1/129 |
| 5,099,773 A * | 3/1992 | Codos | .................... | A41D 27/08 112/420 |
| 5,954,561 A * | 9/1999 | Cannone | ............ | A63H 33/3055 434/127 |
| 6,280,283 B1 | 8/2001 | Sisler | | |
| 6,719,603 B2 | 4/2004 | Chan | | |
| D501,518 S | 2/2005 | Meiry | | |
| 7,258,367 B2 * | 8/2007 | Legrand | ................. | A63H 33/38 281/15.1 |

(Continued)

FOREIGN PATENT DOCUMENTS

WO    WO2006102688    9/2006

*Primary Examiner* — Nini Legesse

(57) ABSTRACT

A hand sewn toy kit includes a plurality of first panels, a plurality of second panels and a plurality of third panels. A selected one of the first panels is selectively positioned between a pair of the second panels to simulate a slice of a food item. Additionally, a selected one of the first panels is selectively positioned between a pair of the third panels to simulate a slice of bread. A selected number of the food items are positioned between a pair of the slices of bread to simulate a sandwich for playing. A sewing kit is provided for stitching the second panels corresponding to the food item together and for stitching the third panels corresponding to the slice of bread together.

8 Claims, 3 Drawing Sheets

(56) References Cited

U.S. PATENT DOCUMENTS

| | | | |
|---|---|---|---|
| 2002/0168919 A1* | 11/2002 | Perkins | A63H 3/005 |
| | | | 446/369 |
| 2010/0048088 A1 | 2/2010 | Cardinale et al. | |
| 2012/0187022 A1* | 7/2012 | Ostroff | A61L 9/12 |
| | | | 206/575 |

* cited by examiner

HAND SEWN TOY KIT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to toy devices and more particularly pertains to a new toy device for constructing simulated food items.

BRIEF SUMMARY OF THE INVENTION

An embodiment of the disclosure meets the needs presented above by generally comprising a plurality of first panels, a plurality of second panels and a plurality of third panels. A selected one of the first panels is selectively positioned between a pair of the second panels to simulate a slice of a food item. Additionally, a selected one of the first panels is selectively positioned between a pair of the third panels to simulate a slice of bread. A selected number of the food items are positioned between a pair of the slices of bread to simulate a sandwich for playing. A sewing kit is provided for stitching the second panels corresponding to the food item together and for stitching the third panels corresponding to the slice of bread together.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
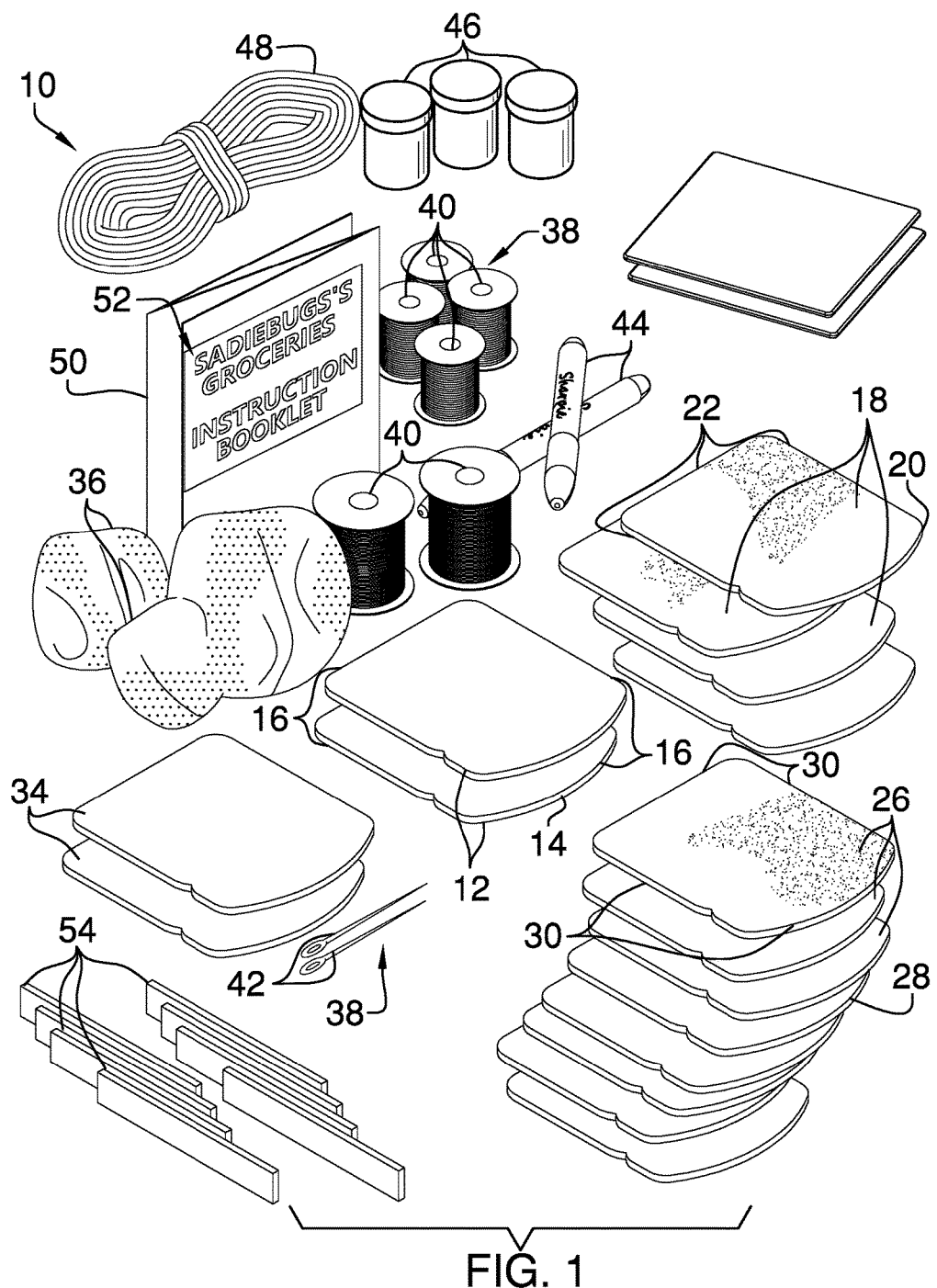
FIG. 1 is a kit view of a hand sewn toy kit according to an embodiment of the disclosure.
Figure 2:
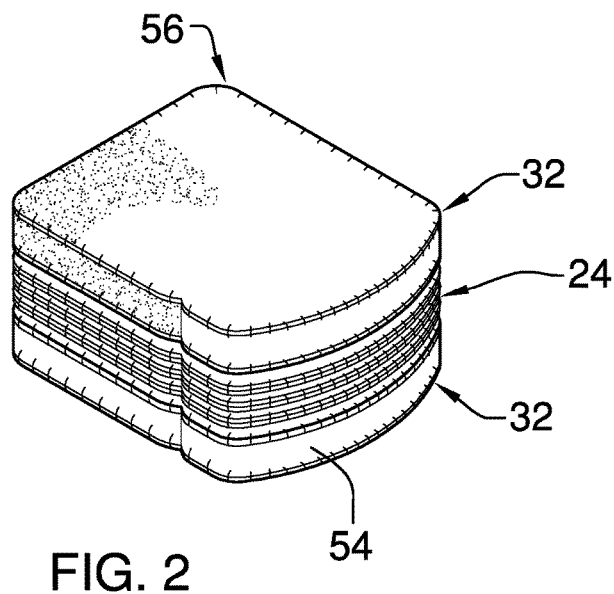
FIG. 2 is a front perspective view of a sandwich of an embodiment of the disclosure.
Figure 3:
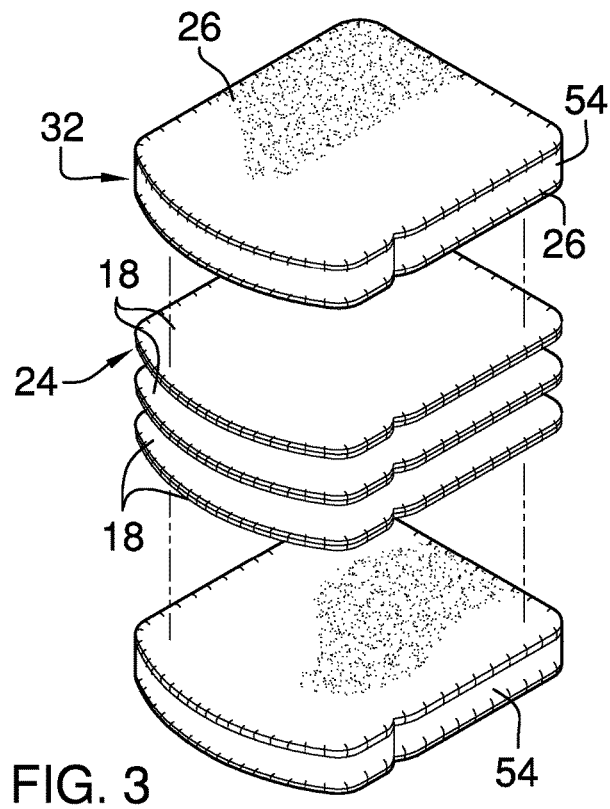
FIG. 3 is an exploded perspective view of a sandwich an embodiment of the disclosure.
Figure 4:
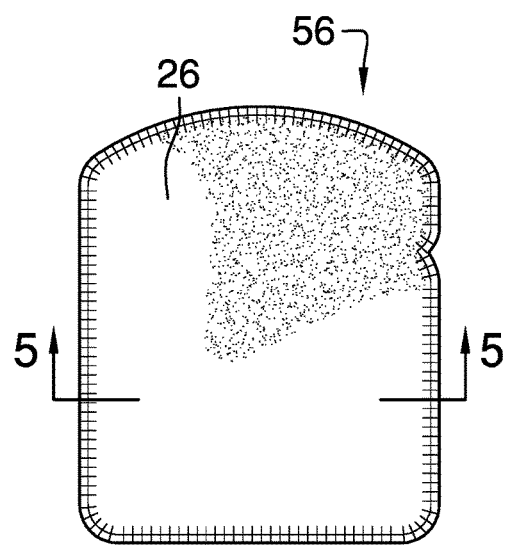
FIG. 4 is a top view of an embodiment of the disclosure.
Figure 5:
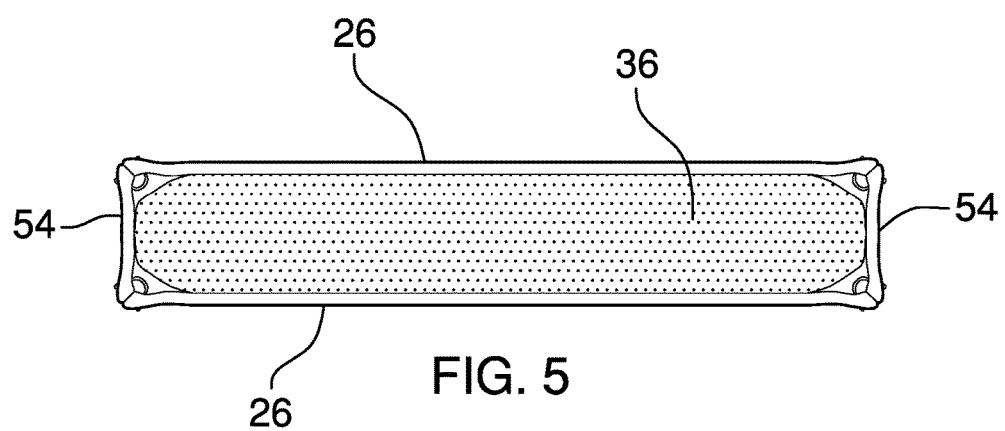
FIG. 5 is a cross sectional view taken along line 5-5 of FIG. 4 of an embodiment of the disclosure.

With reference now to the drawings, and in particular to FIGS. 1 through 5 thereof, a new toy device embodying the principles and concepts of an embodiment of the disclosure and generally designated by the reference numeral 10 will be described.

As best illustrated in FIGS. 1 through 5, the hand sewn toy kit 10 generally comprises a plurality of first panels 12. Each of the first panels 12 is comprised of a rigid material and each of the first panels 12 has a peripheral edge 14. The peripheral edge 14 has a plurality of intersecting sides 16 such that each of the first panels 12 has a rectangular shape.

A plurality of second panels 18 is provided and each of the second panels 18 is comprised of a deformable material such as felt or the like. Each of the second panels 18 has a perimeter edge 20 and the perimeter edge 20 has a plurality of intersecting sides 22 such that each of the second panels 18 has a rectangular shape. Additionally, each of the intersecting sides 22 corresponding to each of the second panels 18 may be shaped to resemble a slice of meat or other sliced food item. A selected one of the first panels 12 is selectively positioned between a pair of the second panels 18 to simulate a sliced food item 24. Each of the second panels 18 may varying colors with respect to each other to facilitate a variety of sliced food items to be simulated.

A plurality of third panels 26 is provided and each of the third panels 26 is comprised of a deformable material such as felt or the like. Each of the first panels 12 has an outer edge 28 the outer edge 28 has a plurality of intersecting sides 30 such that each of the third panels 26 has a rectangular shape. Moreover, each of the intersecting sides 30 corresponding to each of the third panels 26 may be shaped to simulate a sliced food item. A selected one of the first panels 12 is selectively positioned between a pair of the third panels 26 to simulate a slice of bread 32.

A plurality of cushions 34 is provided and each of the cushions 34 is selectively positioned in the slice of bread 32. In this way the third panels 26 corresponding to the selected slice of bread 32 are spaced apart from each other. Each of the cushions 34 may be comprised of a resiliently compressible material. Stuffing 36 may be provided and a selected amount of the stuffing 36 is selectively positioned within the slice of bread 32. The stuffing 36 may comprise unwoven cotton fibers or the like.

A sewing kit 38 is provided and the sewing kit 38 is selectively manipulated to stitch the second panels 18 corresponding to the food item together. Additionally, the sewing kit 38 stitches the third panels 26 corresponding to the slice of bread 32 together. The sewing kit 38 comprises a plurality of spools of thread 40 and a plurality of sewing needles 42. A plurality of markers 44 is provided and each of the markers 44 contains an ink for writing on each of the first, second and third panels 26. Each of the markers 44 may comprise fabric markers 44 or the like.

A plurality of containers 46 is provided and each of the containers 46 contains a liquid paint. The liquid paint in each of the containers 46 has a unique color with respect to each other and the liquid paint is selectively applied to the slice of bread 32 and the food item. A length of yarn 48 is provided and the length of yarn 48 is selectively attached to the food item and the slice of bread 32 for adornment. An instruction booklet 50 is provided and indicia 52 are printed therein. The indicia 52 comprise written instructions for assembling the food item and the slice of bread 32. A plurality of strips 54 is provided and each of the strips 54 is comprised of a deformable material. Selected ones of the strips 54 are sewn between each of the third panels 26 corresponding to the slice of bread 32. In this way the stuffing 36 is retained within the sandwich.

In use, the thread 40 on a selected one of the spools is selectively threaded through a selected one of the sewing needles 42. The selected sewing needle 42 is repeatedly urged through each of the second panels 18 corresponding to the food item 24 to stitch the second panels 18 together. Additionally, the selected sewing needle 42 is repeatedly urged through each of the third panels 26 corresponding to the slice of bread 32 to stitch the third panels 26 together. A selected number of food items 24 are made and a selected number of slices of bread 32 are made. Additionally, a selected number of the food items 24 are positioned between a pair of the slices of bread 32 to simulate a sandwich 56 for playing. The markers 44, the liquid paint in the containers 46 and a selected piece of the length of yarn 48 are manipulated to selectively adorn each of the second and third panels 26.

With respect to the above description then, it is to be realized that the optimum dimensional relationships for the parts of an embodiment enabled by the disclosure, to include variations in size, materials, shape, form, function and manner of operation, kit and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand sewn toy kit being configured to be selectively assembled, said kit comprising:
   a plurality of first panels, each of said first panels being comprised of a rigid material;
   a plurality of second panels, each of said second panels being comprised of a deformable material, a selected one of said first panels being selectively positioned between a pair of said second panels to simulate a slice of a food item;
   a plurality of third panels, each of said third panels being comprised of a deformable material, a selected one of said first panels being selectively positioned between a pair of said third panels to simulate a slice of bread, a selected number of said food items being positioned between a pair of said slices of bread wherein each of said first, second and third panels is configured to simulate a sandwich for playing;
   a sewing kit being configured to be manipulated, said sewing kit stitching said second panels corresponding to said food item together, said sewing kit stitching said third panels corresponding to said slice of bread together;
   a plurality of cushions, each of said cushions being selectively positioned in said slice of bread such that said third panels corresponding to said slice of bread are spaced apart from each other; and
   a plurality of strips, each of said strips being constructed of a deformable material, selected ones of said strips being coupled to and extending between said third panels to provide a peripheral edge of said slice of bread.

2. The kit according to claim 1, wherein:
   each of said first panels has a peripheral edge, said peripheral edge having a plurality of intersecting sides such that each of said first panels has a rectangular shape; and
   each of said second panels has a perimeter edge, said perimeter edge having a plurality of intersecting sides such that each of said second panels has a rectangular shape; and
   each of said first panels has an outer edge, said outer edge having a plurality of intersecting sides such that each of said third panels has a rectangular shape.

3. The kit according to claim 2, wherein said sewing kit comprises:
   a plurality of spools of thread; and
   a plurality of sewing needles, each of said sewing needles being configured to be manipulated, said thread on a selected one of said spools being selectively threaded through a selected one of said sewing needles, said selected sewing needle being repeatedly urged through each of said second panels corresponding to said food item to stitch said second panels together, said selected sewing needle being repeatedly urged through each of said third panels corresponding to said slice of bread to stitch said third panels together.

4. The kit according to claim 1, further comprising a instruction booklet, said instruction booklet having indicia being printed therein, said indicia comprising written instructions for assembling said food items and said slices of bread.

5. The kit according to claim 1, further comprising a plurality of markers, each of said markers being configured to be manipulated, each of said markers containing an ink for writing on each of said first, second and third panels.

6. The kit according to claim 1, further comprising a plurality of containers, each of said containers containing a liquid paint, said liquid paint in each of said containers having a unique color with respect to each other, said liquid paint being selectively applied to said slice of bread and said food item.

7. The kit according to claim 1, further comprising a length of yarn being configured to be manipulated, said length of yarn being selectively attached to said food item and said slice of bread for adornment.

8. A hand sewn toy kit being configured to be selectively assembled, said kit comprising:
- a plurality of first panels, each of said first panels being comprised of a rigid material, each of said first panels having a peripheral edge, said peripheral edge having a plurality of intersecting sides such that each of said first panels has a rectangular shape;
- a plurality of second panels, each of said second panels being comprised of a deformable material, each of said second panels having a perimeter edge, said perimeter edge having a plurality of intersecting sides such that each of said second panels has a rectangular shape, a selected one of said first panels being selectively positioned between a pair of said second panels to simulate a slice of a food item;
- a plurality of third panels, each of said third panels being comprised of a deformable material, each of said first panels having an outer edge, said outer edge having a plurality of intersecting sides such that each of said third panels has a rectangular shape, a selected one of said first panels being selectively positioned between a pair of said third panels to simulate a slice of bread, a selected number of said food items being positioned between a pair of said slices of bread wherein each of said first, second and third panels is configured to simulate a sandwich for playing;
- a plurality of cushions, each of said cushions being selectively positioned in a selected one of said slices of bread such that said third panels corresponding to said selected slice of bread are spaced apart from each other;
- a plurality of strips, each of said strips being constructed of a deformable material, selected ones of said strips being coupled to and extending between said third panels to provide a peripheral edge of said slice of bread;
- a sewing kit being configured to be manipulated, said sewing kit stitching said second panels corresponding to said food item together, said sewing kit stitching said third panels corresponding to said slice of bread together, said sewing kit comprising:
  - a plurality of spools of thread, and
  - a plurality of sewing needles, each of said sewing needles being configured to be manipulated, said thread on a selected one of said spools being selectively threaded through a selected one of said sewing needles, said selected sewing needle being repeatedly urged through each of said second panels corresponding to each of said food items to stitch said second panels together, said selected sewing needle being repeatedly urged through each of said third panels corresponding to each of said slices of bread to stitch said third panels together;
- a plurality of markers, each of said markers being configured to be manipulated, each of said markers containing an ink for writing on each of said first, second and third panels;
- a plurality of containers, each of said containers containing a liquid paint, said liquid paint in each of said containers having a unique color with respect to each other, said liquid paint being selectively applied to said slice of bread and said food item;
- a length of yarn being configured to be manipulated, said length of yarn being selectively attached to said food item and said slice of bread for adornment; and
- an instruction booklet, said instruction booklet having indicia being printed therein, said indicia comprising written instructions for assembling said food item and said slice of bread.

\* \* \* \* \*